US008707093B1

(12) United States Patent
Sites

(10) Patent No.: US 8,707,093 B1
(45) Date of Patent: Apr. 22, 2014

(54) HYBRID REDUNDANT ARRAY OF DISKS

(75) Inventor: Richard Lee Sites, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 200 days.

(21) Appl. No.: 13/401,424

(22) Filed: Feb. 21, 2012

(51) Int. Cl.
*G06F 11/00* (2006.01)

(52) U.S. Cl.
USPC .......................................... 714/6.24; 714/784

(58) Field of Classification Search
USPC ................................ 714/6.22, 6.24, 1, 2, 784
See application file for complete search history.

(56) References Cited

U.S. PATENT DOCUMENTS

| 7,827,441 B1* | 11/2010 | Wenzel ........................ 714/6.13 |
| 2010/0235677 A1* | 9/2010 | Wylie et al. ........................ 714/5 |
| 2013/0097376 A1* | 4/2013 | Hall et al. ..................... 711/114 |

OTHER PUBLICATIONS

RAID; http://en.wikipedia.org/wiki/RAID; Wikipedia, The Free Encyclopedia as retrieved Jan. 6, 2012, 22 pages.
Standard RAID Levels; http://en.wikipedia.org/wiki/Standard_RAID_levels; Wikipedia, The Free Encyclopedia as retrieved Dec. 28, 2011, 14 pages.

\* cited by examiner

*Primary Examiner* — Yolanda L Wilson
(74) *Attorney, Agent, or Firm* — Fish & Richardson P.C.

(57) ABSTRACT

A system, method and program product, the system in embodiments comprising: one or more computers operably connected to one or more computer-readable storage media comprising computer-readable program code to perform steps: associating a first plurality of data disk blocks; generating checksum data on a second plurality of checksum disk blocks, using an m-out-of-n encoding algorithm; generating a third plurality of redundant storage disk blocks, using an 1-out-of-n encoding algorithm that allows for reconstruction using a second recovery algorithm of a selected disk block by reading a proper subset of remaining data disk blocks, reconstructing a single one of the data disk blocks when one or more reconstruction criteria are met, using the second recovery algorithm; reconstructing, when two or more of the data disk blocks are lost, the two or more of the data disk blocks and/or checksum disk blocks that are lost, using the first recovery algorithm.

20 Claims, 5 Drawing Sheets

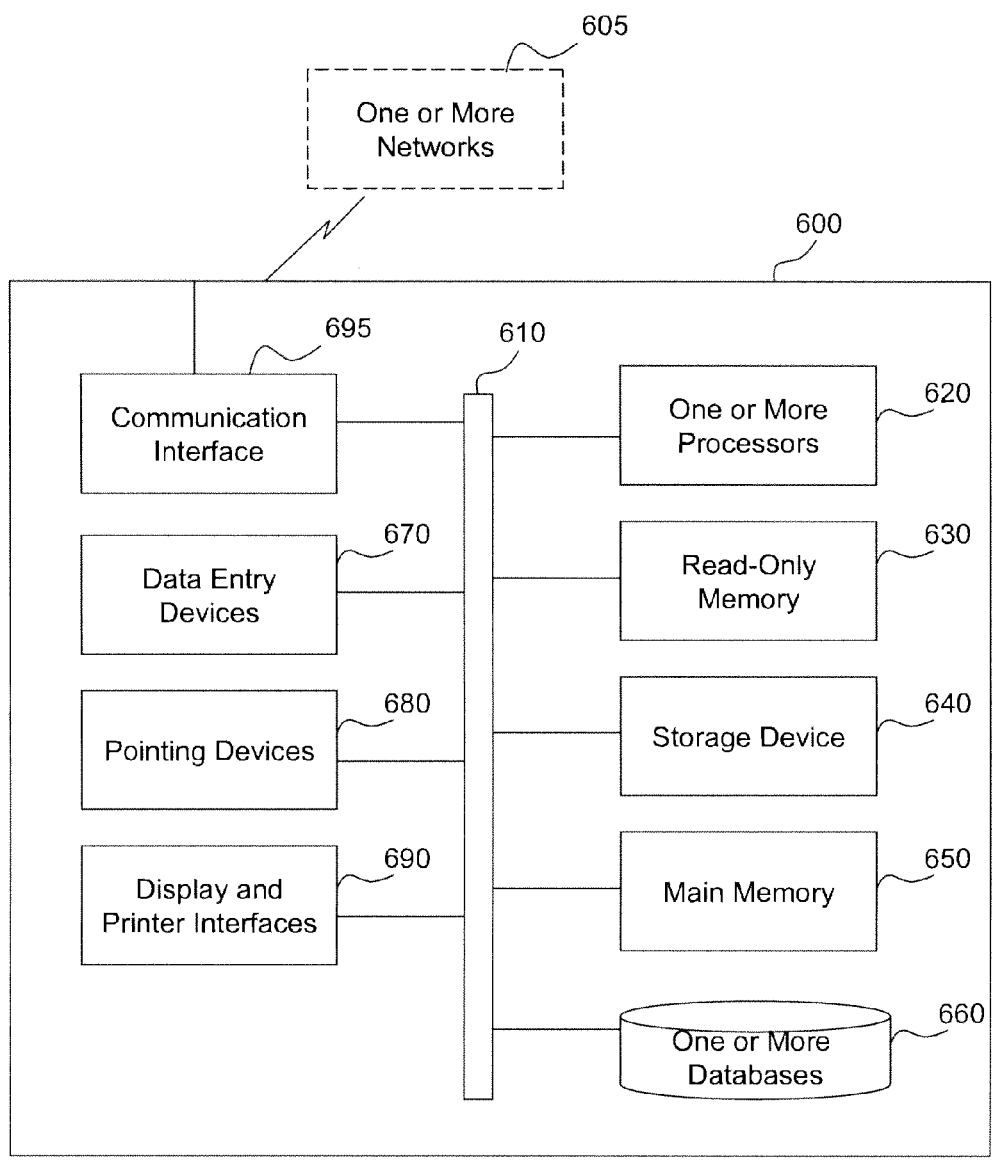

HYBRID REDUNDANT ARRAY OF DISKS

BACKGROUND

Redundant arrays of independent disks (RAID) are used to increase storage reliability. RAID is a storage technology that combines multiple disk drive components into a logical unit. Data is distributed across the disk drives in one of several ways called "RAID levels," depending on what level of redundancy and performance is required. It is desired to obtain improved storage reliability and cost for such RAID arrays.

SUMMARY

In embodiments, a system is provided, comprising: one or more computers operably connected to one or more computer-readable storage media; the one or more computer-readable storage media comprising computer-readable program code capable, when executed, to perform steps: associating or having associated or receiving, using the one or more computers, an association of a first plurality of data disk blocks; and generating or having generated or receiving, using the one or more computers, checksum data and storing the checksum data on a second plurality of checksum disk blocks, the checksum data generated for the first plurality of data disk blocks using an m-out-of-n encoding algorithm that allows reconstruction using a first recovery algorithm of n disk blocks after losing up to m disk blocks, generating or having generated a third plurality of redundant storage disk blocks, using the one or more computers and a 1-out-of-n encoding algorithm that allows for reconstruction using a second recovery algorithm of a selected disk block by reading a proper subset of remaining data disk blocks, with each of the respective redundant storage disk blocks associated with a different proper subset comprising a different respective one or more of the data disk blocks; reconstructing a single one of the data disk blocks when one or more reconstruction criteria are met, using the one or more computers, by reading one of the redundant storage disk blocks associated with the single data disk block and reading the other of the one or more data disk blocks in the proper subset associated with the one redundant storage disk block, and performing the second recovery algorithm with those disk blocks that are read; and reconstructing, when two or more of the data disk blocks and/or checksum disk blocks are lost, the two or more of the data disk blocks and/or checksum disk blocks that are lost, using the one or more computers, by reading remaining of the first plurality of the data disk blocks and the second plurality of the checksum blocks and performing the first recovery algorithm with those read disk blocks.

In further embodiments, a method is provided, comprising: associating or having associated or receiving, using one or more computers, an association of a first plurality of data disk blocks; generating or having generated or receiving, using the one or more computers, checksum data and storing the checksum data on a second plurality of checksum disk blocks, the checksum data generated for the first plurality of data disk blocks using an m-out-of-n encoding algorithm that allows reconstruction using a first recovery algorithm of n disk blocks after losing up to m disk blocks; and generating or having generated a third plurality of redundant storage disk blocks, using the one or more computers and a 1-out-of-n encoding algorithm that allows for reconstruction using a second recovery algorithm of a selected disk block by reading a proper subset of remaining data disk blocks, with each of the respective redundant storage disk blocks associated with a different proper subset comprising a different respective one or more of the data disk blocks. In embodiments, the method may further comprise reconstructing a single one of the data disk blocks when one or more reconstruction criteria are met, using the one or more computers, by reading one of the redundant storage disk blocks associated with the single data disk block and reading the other of the one or more data disk blocks in the proper subset associated with the one redundant storage disk block, and performing the second recovery algorithm with those disk blocks that are read; and reconstructing, when two or more of the data disk blocks and/or checksum disk blocks are lost, the two or more of the data disk blocks and/or checksum disk blocks that are lost, using the one or more computers, by reading remaining of the first plurality of the data disk blocks and the second plurality of the checksum blocks and performing the first recovery algorithm with those read disk blocks.

Yet further embodiments comprise a system and method, implemented to be capable of performing the steps: associating or having associated or receiving, using the one or more computers, an association of a first plurality of data disk blocks; generating or having generated or receiving, using the one or more computers, checksum data and storing the checksum data on a second plurality of checksum disk blocks, the checksum data generated for the first plurality of data disk blocks using a Reed-Solomon algorithm; generating or having generated, using the one or more computers, a third plurality of exclusive-OR (XOR) disk blocks, with each of the respective XOR disk blocks associated with a different respective proper subset comprising one or more different data disk blocks and comprising XOR data for the respective one or more of the data disk blocks; reconstructing, a single one of the data disk blocks when one or more reconstruction criteria are met, using the one or more computers, by reading one of the XOR disk blocks associated with the single data disk block and reading the other of the one or more of the data disk blocks in the proper subset of the data disk blocks associated with the one XOR disk block, and performing an XOR operation with those read disk blocks; and reconstructing, when two or more of the data disk blocks and/or the checksum blocks are lost, the two or more of the disk blocks that are lost, using the one or more computers, by reading remaining of the first plurality of the data disk blocks and the second plurality of the checksum blocks that are not lost and performing a Reed-Solomon recovery algorithm with those read disk blocks.

BRIEF DESCRIPTION OF THE DRAWINGS

The above and related objects, features and advantages of the present disclosure will be more fully understood by reference to the following detailed description, when taken in conjunction with the following figures, wherein:

FIG. 6 is a schematic block diagram of a computer configuration that may be used to implement embodiments.

DETAILED DESCRIPTION

Embodiments described generally relate to a system, method and program product for improving RAID storage reliability and cost while improving the speed of alternate reads. For a reference to RAID configurations see for example, the Wikipedia reference http://en.wikipedia.org/wiki/RAID.

The description to follow uses the term "disk block." The size of a disk block need not be specified, but comprises some fixed-size collection of bytes. Typical disk blocks under Windows, MacOS, and Linux are 4 KB. XORs and checksums to be described below may be calculated across corresponding individual disk blocks. Disk files are ordered collections of one or more disk blocks. Typically, disk blocks within a single disk file may be spread across multiple data disks, and redundancy is applied at the disk block level.

A hybrid disk storage configuration is disclosed to improve the speed of alternate reads when a single disk block has failed or to improve the speed of an alternate read when a primary disk block is a hot spot, while reducing the number of disk blocks required for reliability.

In embodiments, an m-out-of-n encoding algorithm is used that allows reconstruction using a first recovery algorithm of n disk blocks after losing up to m disk blocks, in combination with a 1-out-of-n encoding algorithm that allows for reconstruction using a second recovery algorithm of a selected disk block by reading a proper subset of remaining data disk blocks.

Figure 1:
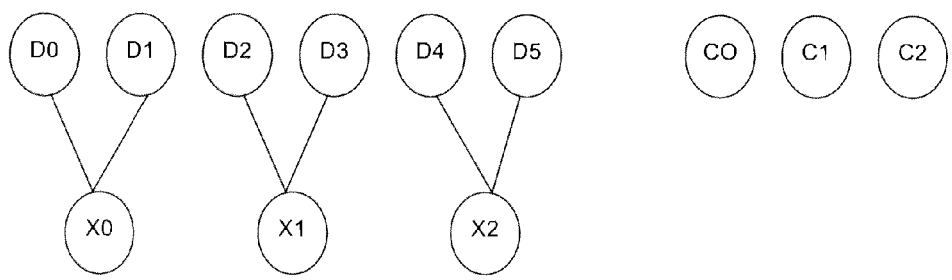
FIG. 1 is a first schematic diagram of data disks, checksum disk blocks, and XOR disk blocks that may be used to implement embodiments.

An example of such a hybrid configuration is shown in FIG. 1. FIG. 1 comprises six disk blocks D1-D6, stored using both the m-out-of-n encoding algorithm and the 1-out-of-n encoding algorithm. In FIG. 1, the hybrid comprises the Reed-Solomon algorithm as the m-out-of-n encoding algorithm, and an exclusive-OR RAID algorithm as the 1-out-of-n encoding algorithm. In this example, a Reed-Solomon arrangement of 6 data blocks D0, D1, D2, D3, D4, D5 may comprise three Reed-Solomon checksum blocks C0, C1, C2. The hybrid configuration herein adds three more disk blocks X0, X1, X2 comprising the exclusive-OR (XOR) or parity of pairs of data blocks: e.g., X0=D0 XOR D1, X1=D2 XOR D3, and X2=D4 XOR D5. This example configuration provides full redundancy of the original Reed-Solomon encoding, but also provides in this example, three distinct sets of RAID 5 encodings: <D0, D1, X0> and <D2, D3, X1> and <D4, D5, X2>. With this configuration, for each of the original six disk blocks, D0, D1, D2, D3, D4, D5, when a single one of the data disk blocks suffers a failure, a fast alternate read can be accomplished using the 1-out-of-n encoding algorithm to reconstruct the data by reading the two other disk blocks within its RAID 5 set. However, when there are two or more disk block failures, alternate reads may be accomplished using the m-out-of-n encoding algorithm comprising the Reed-Solomon algorithm. Embodiments of this hybrid design provide a balance between disk block space and alternate-read speed.

Figure 2:
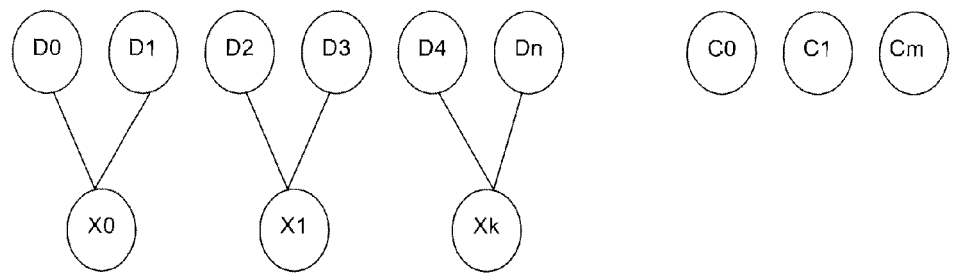
FIG. 2 is a second schematic diagram of data disks, checksum disk blocks, and XOR disk blocks that may be used to implement embodiments.

FIG. 2 illustrates the general case of n disk blocks D0, D1, D2, D3, D4, ..., Dn, using an embodiment of the hybrid configuration. In this case, there are shown m checksum blocks C0, C1, and Cm. There are also k XOR disk blocks. With this configuration, at least m disks can be lost and the data may be reconstructed by reading any remaining disks. Such reads to reconstruct the lost disks may include, in some embodiments, a read one or more of the XOR disks. But the configuration of this embodiment also provides for a fast alternate read to reconstruct the data if just one disk block is lost by reading the remaining disk blocks in the RAID 5 set associated with the lost disk block. Space cost for this configuration is (n+m+k)/n (typical: 2.0x). For example, if n data blocks are used, along with m Reed-Solomon checksum blocks, along with k XOR blocks, a total of n+m+k blocks are used to store n blocks of data. For typical values like n=6, m=3, k=3, this means 12 blocks are used to store 6 blocks of data or a space-blowup cost of 12/6=2x. Using this scheme, such a configuration would have to buy twice as many disks, compared to just buying disks to store the data. In comparison, using triplication, the space cost would be n+n+n=18/6=3x.

Figure 3:
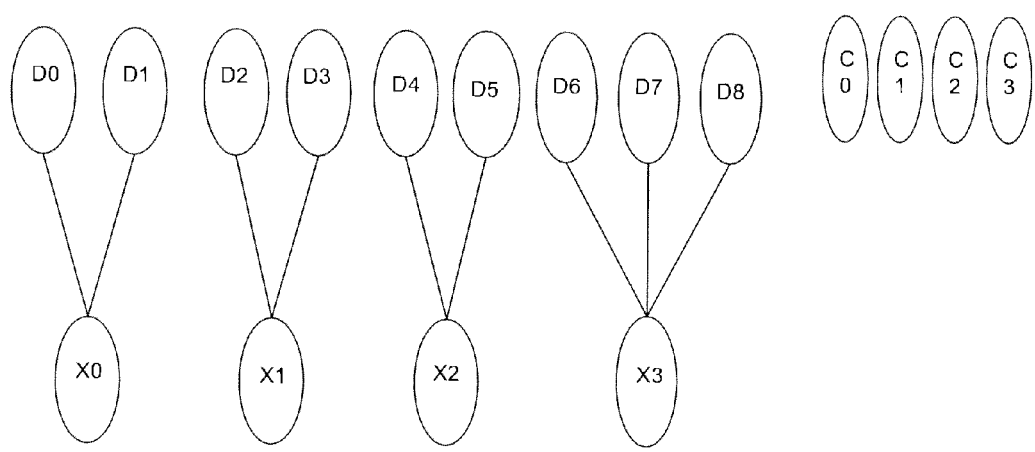
FIG. 3 is a third schematic diagram of data disks, checksum disk blocks, and XOR disk blocks that may be used to implement embodiments.

FIG. 3 describes a further embodiment. In this configuration, nine data blocks D0, D1, D2, D3, D4, D5, D6, D7, D8, are shown, with four (arbitrary number) Reed-Solomon checksum blocks C0 ... C3, and four XOR blocks, X0=D0 XOR D1, X1=D2 XOR D3, X2=D4 XOR D5, and X3=D6 XOR D7 XOR D8.

Figure 4:
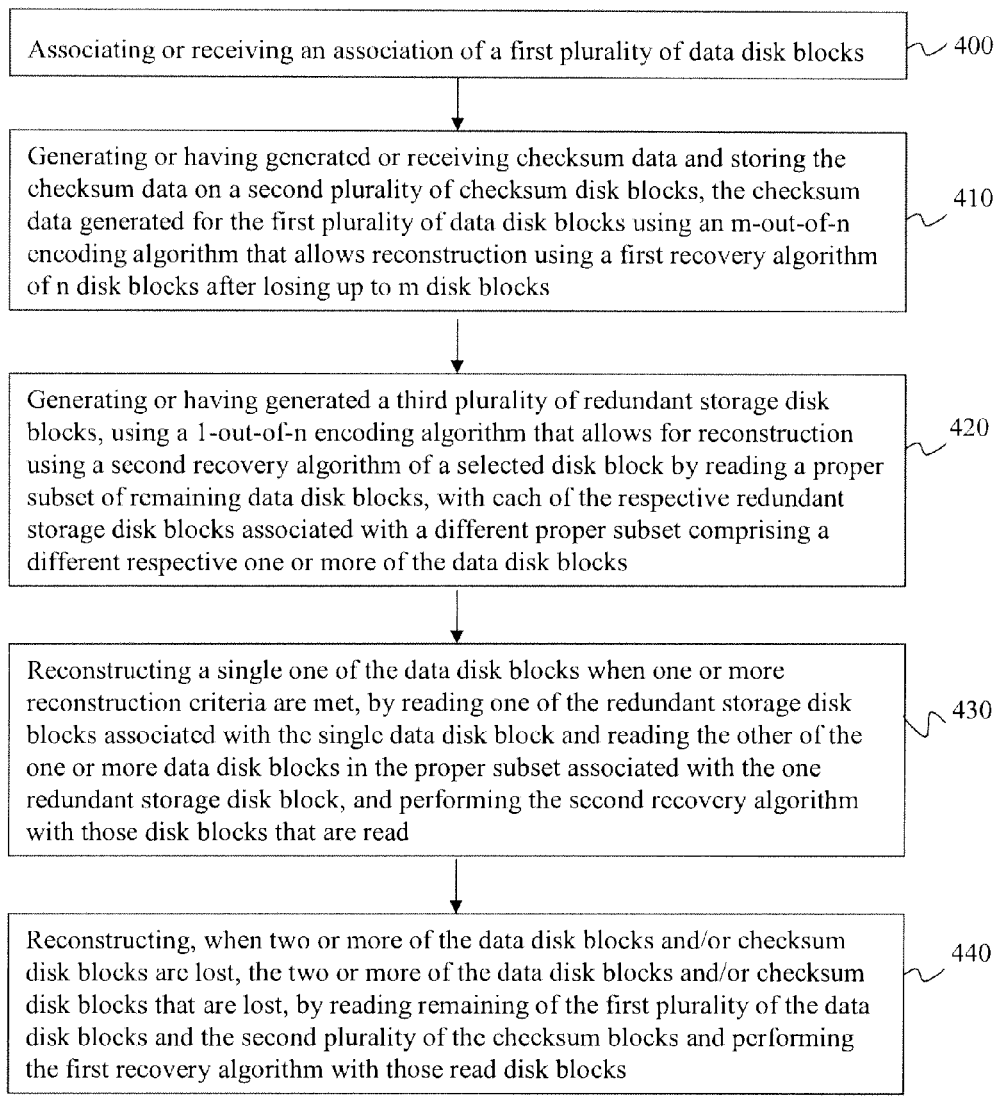
FIG. 4 is a first flowchart illustrating embodiments.

FIG. 4 describes embodiments of a method consistent herewith. Block 400 comprises an operation of associating or having associated or receiving an association of a first plurality, (e.g. 6, or more generally n), of data disk blocks, using one or more computers.

In embodiments, block 410 comprises an operation of generating or having generated or receiving, using the one or more computers, checksum data and storing the checksum data on a second plurality of checksum disk blocks, the checksum data generated for the first plurality of data disk blocks using an m-out-of-n encoding algorithm that allows reconstruction using a first recovery algorithm of n disk blocks after losing up to m disk blocks. In embodiments, such m-out-of-n encoding algorithms may comprise Reed-Solomon coding for generating checksum blocks C0 ... Cm, Cauchy-Reed-Solomon encoding for generating checksum blocks C0 ... Cm, or any alternative redundant storage design allowing for reconstruction of two or more lost blocks by reading a plurality of remaining data and checksum blocks.

In embodiments, block 420 comprises an operation of generating or having generated a third plurality of redundant storage disk blocks, using the one or more computers and a 1-out-of-n encoding algorithm that allows for reconstruction using a second recovery algorithm of a selected disk block by reading a proper subset of remaining data disk blocks, with each of the respective redundant storage disk blocks associated with a different proper subset comprising a different respective one or more of the data disk blocks. In embodiments, the subset encoding algorithm may comprise XOR coding for generating XOR blocks X0 ... Xk, or any alternative redundant storage design allowing for reconstruction of one lost block by reading a proper subset of the plurality of remaining data disk blocks. Those skilled in the art will also recognize that in some encoding designs, the contents of some Ci block will always be identical to some Xj block, in which case the Xj block need not be stored.

In embodiments, block 430 comprises an operation of reconstructing a single one of the data disk blocks when one or more reconstruction criteria are met, using the one or more computers, by reading one of the redundant storage disk blocks associated with the single data disk block and reading the other of the one or more data disk blocks in the proper subset associated with the one redundant storage disk block, and performing the second recovery algorithm with those disk blocks that are read.

In embodiments, block 440 comprises an operation of reconstructing, when two or more of the data disk blocks and/or checksum disk blocks are lost, the two or more of the data disk blocks and/or checksum disk blocks that are lost, using the one or more computers, by reading remaining of the first plurality of the data disk blocks and the second plurality of the checksum blocks and performing the first recovery algorithm with those read disk blocks.

Figure 5:
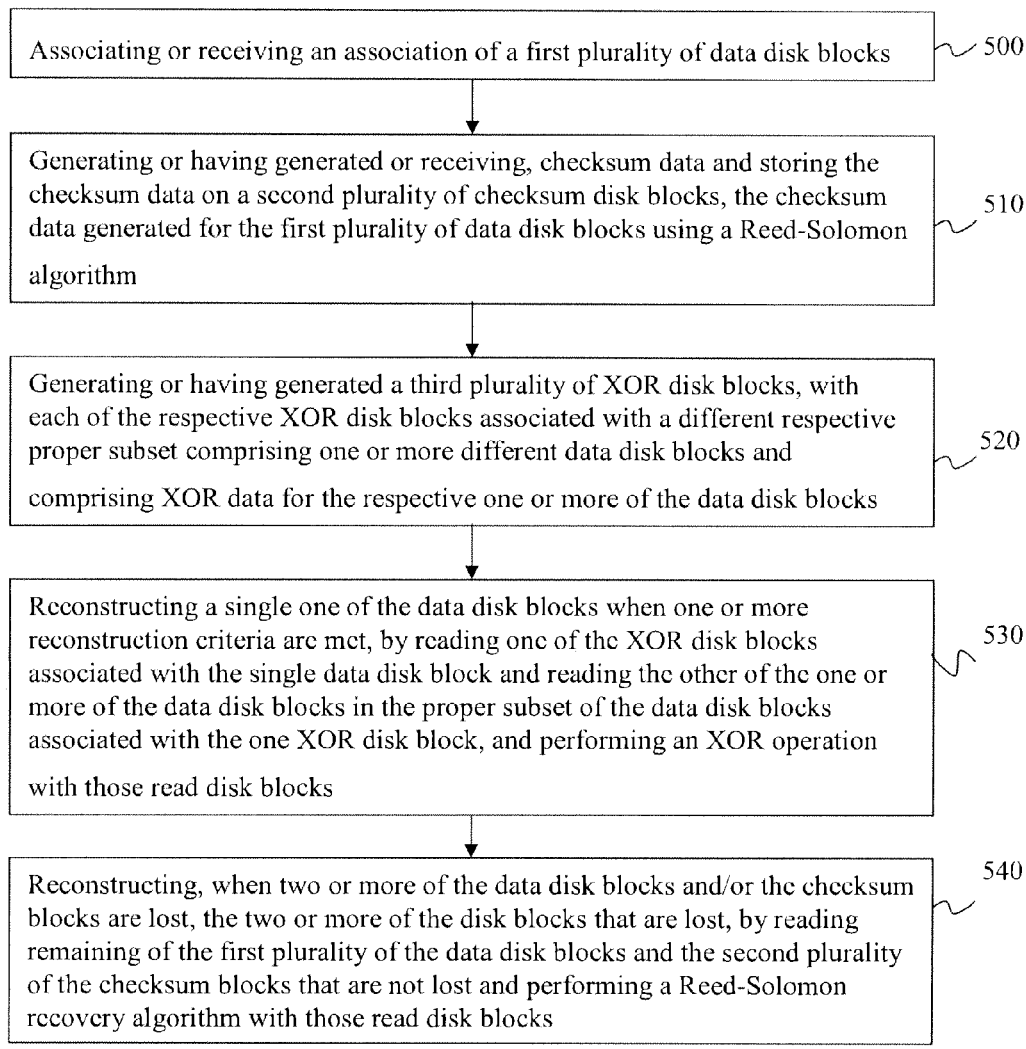
FIG. 5 is a second flowchart illustrating embodiments.

FIG. 5 describes embodiments of a method consistent herewith. Block 500 comprises an operation of associating or having associated or receiving an association of a first plurality, (e.g. 6, or more generally n), of data disk blocks, using one or more computers.

In embodiments, block 510 comprises an operation of generating or having generated or receiving, using the one or more computers, checksum data and storing the checksum data on a second plurality, (e.g., 3, or more generally m), of checksum disk blocks, the checksum data generated for the first plurality of data disk blocks using a Reed-Solomon algorithm.

In embodiments, block 520 comprises an operation of generating or having generated, using the one or more computers, a third plurality, (e.g., 3, or more generally k), of XOR disk blocks, with each of the respective XOR disk blocks associated with a different respective proper subset comprising one or more different data disk blocks, (e.g. 2, or more generally p), and comprising XOR data for the respective one or more of the data disk blocks in this proper subset. For example, in FIG. 3 where there is an odd number of data disk blocks, some of the XOR's use two data disk blocks, but X3 performs an XOR with 3 data disk blocks.

In embodiments, block 530 comprises an operation of reconstructing, a single one of the data disk blocks when one or more reconstruction criteria are met, using the one or more computers, by reading one of the XOR disk blocks associated with the single data disk block and reading the other of the one or more of the data disk blocks in the proper subset of the data disk blocks associated with the one XOR disk block, and performing an XOR operation with those read disk blocks. For example, if D1 is lost, D0 XOR X0=D0 XOR (D0 XOR D1)=(D0 XOR D0) XOR D1=0 XOR D1=D1. If X0 is lost, it is not necessary to reconstruct the XOR block by reading data D0 or D1. However, in embodiments, the lost XOR may be reconstructed by recalculating X0=D0 XOR D1, either immediately, or after some period of time has elapsed or other criterion is met.

In embodiments, block 540 comprises an operation of reconstructing, when two or more of the data disk blocks and/or the checksum blocks are lost, the two or more of the disk blocks that are lost, using the one or more computers, by reading remaining of the first plurality of the data disk blocks and the second plurality of the checksum blocks that are not lost and performing a Reed-Solomon recovery algorithm with those read disk blocks. If one or more of the Reed-Solomon checksum disk blocks are lost, in embodiments they may be reconstructed either immediately, or at leisure, by reading all of the data disk blocks D0 . . . D6 and recalculating the checksum after some period of time has elapsed or other criterion is met. Likewise, if one or more of the XOR blocks is lost, then the one or more XOR blocks may be recalculated, at leisure, by reading appropriate ones of the data blocks and performing the XOR operation, e.g., reading D0 and D1 and recalculating X0. The purpose of reconstruction at leisure (e.g., over the course of 20 minutes to 4 hours), is to restore the full redundancy before another disk fails.

Thus, in embodiments, an alternate read for a single lost disk block may be accomplished by reading only the disk blocks in the RAID Group for the lost disk block, without reading from N other disks (N=6 would be a typical value). In some embodiments, both modest disk space usage (N=2 typically) and fast alternate reads are realized.

Alternate reads may be important in commercial or cloud services that carry large amounts of data on disk block and are subject to "hot spots" in which disproportionate amounts of traffic are directed to a small number of disk blocks. In that situation, reading from a "hot" disk block can involve significant delays, making alternate reads from less-busy disk blocks desirable. Accordingly, in embodiments an operation may be provided of performing an alternate read operation for a single disk block if one or more criteria are met indicating that the disk block comprises a "hot spot." In embodiments, one criterion may comprise the number of reads from a given disk block within a time period exceeding a threshold number of reads.

In embodiment, the hybrid configuration may take less disk block space compared to simple replication, and may require fewer disk block reads than Reed-Solomon or RAID 6 to do an alternate read.

FIG. 6 is a block diagram showing an embodiment of a computer system that may be used for implementations, generally designated by reference number 600 in FIG. 6. In one embodiment, the system 600 may be communicatively coupled to one or more networks 605 via a communication interface 695. The one or more networks 605 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 695 may be implemented accordingly. The network 605 serves the purpose of delivering information between connected parties.

In embodiments, the Internet may comprise the network 605. The system 600 may also or alternatively be communicatively coupled to a network 605 comprising a closed network (e.g., an intranet). The system 600 may be configured to communicate, via the one or more networks 605, with respective computer systems of multiple entities.

The system 600 may comprise, in embodiments, a computing platform for performing, controlling, and/or initiating computer-implemented operations, for example, via a server and the one or more networks 605. The computer platform may comprise system computers and other party computers. The system 600 may operate under the control of computer-executable instructions to carry out the process steps described herein. Computer-executable instructions comprise, for example, instructions and data which cause a general or special purpose computer system or processing device to perform a certain function or group of functions. Computer software for the system 600 may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 600 may comprise, one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

The system 600 may comprise, in embodiments, a bus 610 or other communication component that couples the various system elements 620-695, and is configured to communicate information between the various system elements 620-695.

As shown in FIG. 6, one or more computer processors 620 may be coupled with the bus 610 and configured to process and handle information and execute instructions. The system 600 may include a main memory 650, such as a Random Access Memory (RAM) or other dynamic storage device, coupled to the bus 600, for storing information and instructions to be executed by the one or more processors 620. The main memory 650 also may be used for storing temporary variables or other intermediate information during execution of instructions by the one or more processors 620.

The system 600 further may include a Read-Only Memory (ROM) 630 or other static storage device (e.g., EPROM, EAROM, EEPROM, PROM, flash, and the like) coupled to the bus 610 for storing static information and instructions for the one or more processors 620. Furthermore, a storage device 640, such as a magnetic disk or optical disk, such as a CD-ROM or other optical media may be provided and coupled to the bus 610 for storing information and instructions.

In addition to the ROM 630, one or more databases 660 may be coupled to the bus 610 for storing static information and software instructions. Information stored in or maintained in the database 660 may be provided in conformance with a database system format such as, but not limited to, the Structured Query Language (SQL) format. Database query and access instructions, for example, in the form of one or more scripts, may be used which, when executed by a processor such as the processor 620, serve to access, store and retrieve data maintained in the database 660 according to the instructions contained in the script.

Furthermore, the system 600 may comprise application software instructions which may implement a user interface portion for generating interactive pages or display screens by which a user may provide data to and receive information from the system 600 and the database 660 using a human-machine interface. Interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. A user may interact with the system 600 via the graphical user interface by using a pointing device and/or data entry device. The GUI portion may place the output of the system 600 in a format for presentation to a user via the display. In at least one embodiment, the GUI may be implemented as a sequence of Java instructions.

A data entry device 670, including alphanumeric and other keys, or a pointing device such as a mouse or trackball, or a scanner, to name a few, may be coupled to the bus 610 for communicating information and command selections to the processor 620. The data entry device 670 may be coupled to the bus 610 via an interface (not shown), wherein the interface may be, for example, a serial port, an RS-232 port, or the like. In addition, the interface may be a wireless interface and provide connection-less communication via, for example, Bluetooth communication.

The system 600 may be coupled via the bus 610 to a display or printer 690 for outputting information to a computer user. In addition, a user may use the display (e.g., touch screen) or printer (e.g., scanner) to provide information to the system 600.

In embodiments, the various program operations as described herein may be provided by the system 600 in response to the one or more processors 620 executing one or more sequences of computer-readable instructions contained in the main memory 650. Such instructions may be read into the main memory 650 from another computer-readable medium, such as the ROM 630, the storage device 640, or the database 660. Execution of the sequences of instructions contained in the main memory 650 may cause the one or more processors 620 to perform the process steps described herein. It should be appreciated embodiments of the system 600 may perform fewer or additional processes as compared to those described herein. As noted, the one or more processors 620 may be arranged in a multi-processing arrangement. Alternatively, hard-wired circuitry may be used in place of or in combination with software instructions to implement the invention. Thus, embodiments of the invention are not limited to any specific combination of hardware circuitry and software.

As previously noted, the system 600 also comprises a communication interface 695 coupled to the bus 610 for providing one-way, two-way or multi-way data communication with the network 605, or directly with other devices. In embodiments, the communication interface 695 may comprise a modem, a transceiver Integrated Services Digital Network (ISDN) card, a WAN card, an Ethernet interface, or the like, to provide a data communication connection to a corresponding type of communication medium. As another example, the communication interface 695 may comprise a LAN card to provide a data communication connection to a compatible LAN. Wireless links may also be implemented. In such wireless links, communication interface 695 may communicate with a base station communicatively coupled to a network server. In any such implementation, the communication interface 695 sends and receives electrical, electromagnetic, radio, infrared, laser, or optical signals that carry digital data streams representing various types of information. Any combination of the above interfaces may also be implemented.

In embodiments, the communication interface 695 may be communicatively coupled to a web server configured to generate and output web content that is suitable for display using a web browser at a computing device. In embodiments, the server may generate and transmit requested information through the communication interface 695 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals, access and process data from various sources, and output computer-executable instructions and data using the network 605.

The web server, in embodiments, may correspond to a secure web application server operating behind a web server program that a service provider employs to run one or more web based application programs to carry out the methods described above in a secure fashion. Such a secure web application server may be configured to execute one or more web based application programs, respond to commands and data received from the clients (via a web page supported by the web server), and provide data and results to the clients. The web server and the web application server may be implemented using a single computing platform. Alternatively, it may be implemented using multiple separate and distributed computing platforms.

Embodiments include program products comprising machine-readable media with machine-executable instructions or data structures stored thereon. Such machine-readable media may be any available storage media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other storage medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers (including mobile devices) having processors. Logical connections may include the previously noted local area network (LAN) and a wide area network (WAN) that are presented here by way of example and not limitation. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

A non-limiting embodiment of a system for implementing embodiments comprises one or more computers operatively connected/accessible to computer-readable program code stored in memory, and capable of loading and executing that program code to configure the one or more computers into one or more special-purpose machines. The code, in embodiments, may be comprised of programs that implement functional components in the one or more computers. These components may be stored separately or in combination. In the embodiments, the one or more computers are configured, with program code for associating or having associated or receiving an association of a first plurality of data disk blocks. Checksum program code is provided to generate or having generated or receive, using the one or more computers, checksum data using an m-out-of-n encoding algorithm and store the checksum data on a second plurality of checksum disk blocks. A program is provided for generating or having generated, using the one or more computers, a third plurality of X disk blocks, using a 1-out-n encoding algorithm, with each of the respective X disk blocks associated with a different respective fourth plurality of the data disk blocks and comprising recovery data for the respective fourth plurality of the data disk blocks. A single disk block reconstruction program comprises code for reconstructing a single one of the disk blocks when one or more reconstruction criteria are met, using the one or more computers, by reading one of the X disk blocks associated with the single disk block and reading the other of the one or more data disk blocks in the fourth plurality of the data disk blocks associated with the single X disk block, and performing second recovery algorithm. An m-out-of-n disk block recovery program comprises code for reconstructing two or more of the disk blocks that are lost, using the one or more computers, by reading remaining of the first plurality of the data disk blocks and the second plurality of the checksum blocks not lost and performing a first recovery algorithm. Various other program code may also be included.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments to form an embodiment with this added element or step.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:
1. A system, comprising:
one or more computers operably connected to one or more computer-readable storage media;
the one or more computer-readable storage media comprising computer-readable program code capable, when executed, to perform steps:
generating or having generated or receiving, using the one or more computers, checksum data for a first plurality of data disks blocks that are associated with each other, and storing the checksum data on a second plurality of checksum disk blocks, the checksum data generated for the first plurality of data disk blocks using an m-out-of-n encoding algorithm that allows reconstruction using a first recovery algorithm of n disk blocks after losing up to m disk blocks;

generating or having generated a third plurality of redundant storage disk blocks, using the one or more computers and a 1-out-of-n encoding algorithm that allows for reconstruction using a second recovery algorithm of a selected disk block by reading a proper subset of remaining data disk blocks, with each of the respective redundant storage disk blocks associated with a different proper subset comprising a different respective one or more of the data disk blocks;

reconstructing a single one of the data disk blocks when one or more reconstruction criteria are met, using the one or more computers, by reading one of the redundant storage disk blocks associated with the single data disk block and reading the other of the one or more data disk blocks in the proper subset associated with the one redundant storage disk block, and performing the second recovery algorithm with those disk blocks that are read; and reconstructing, when two or more of the data disk blocks and/or checksum disk blocks are lost, the two or more of the data disk blocks and/or checksum disk blocks that are lost, using the one or more computers, by reading remaining of the first plurality of the data disk blocks and the second plurality of the checksum blocks and performing the first recovery algorithm with those read disk blocks.

2. The system as defined in claim 1, where one of the one or more reconstruction criteria is that the single disk block is lost.

3. The system as defined in claim 1, where one of the one or more criteria is that the single disk block is a data disk block and is determined, using the one or more computers, to meet one or more traffic level criteria.

4. The system as defined in claim 3, wherein one of the traffic level criteria comprises a number of read requests exceeding a threshold number.

5. The system as defined in claim 1, wherein the first plurality is 6, the second plurality is 3, the third plurality is 3, and the proper subset is 2 or 3.

6. The system as defined in claim 1, comprising the one or more computers configured to perform the step:
selecting respective data disk blocks for the first plurality of data disk blocks for which more than a predetermined number of read requests are received.

7. The system as defined in claim 1, wherein the m-out-of-n encoding algorithm is a Reed-Solomon encoding algorithm.

8. The system as defined in claim 1, wherein the 1-out-of-n encoding algorithm is an exclusive-OR encoding algorithm.

9. A method, comprising:
generating or having generated or receiving, using the one or more computers, checksum data for a first plurality of data disks blocks that are associated with each other, and storing the checksum data on a second plurality of checksum disk blocks, the checksum data generated for the first plurality of data disk blocks using an m-out-of-n encoding algorithm that allows reconstruction using a first recovery algorithm of n disk blocks after losing up to m disk blocks;

generating or having generated a third plurality of redundant storage disk blocks, using the one or more computers and a 1-out-of-n encoding algorithm that allows for reconstruction using a second recovery algorithm of a selected disk block by reading a proper subset of remaining data disk blocks, with each of the respective redundant storage disk blocks associated with a different proper subset comprising a different respective one or more of the data disk blocks;

reconstructing a single one of the data disk blocks when one or more reconstruction criteria are met, using the one or more computers, by reading one of the redundant storage disk blocks associated with the single data disk block and reading the other of the one or more data disk blocks in the proper subset associated with the one redundant storage disk block, and performing the second recovery algorithm with those disk blocks that are read; and reconstructing, when two or more of the data disk blocks and/or checksum disk blocks are lost, the two or more of the data disk blocks and/or checksum disk blocks that are lost, using the one or more computers, by reading remaining of the first plurality of the data disk blocks and the second plurality of the checksum blocks and performing the first recovery algorithm with those read disk blocks.

10. The method as defined in claim 9, where one of the one or more reconstruction criteria is that the single disk block is lost.

11. The method as defined in claim 9, where one of the one or more criteria is that the single disk block is a data disk block and is determined, using the one or more computers, to meet one or more traffic level criteria.

12. The method as defined in claim 11, wherein one of the traffic level criteria comprises a number of read requests exceeding a threshold number.

13. The method as defined in claim 9, wherein the first plurality is 6, the second plurality is 3, the third plurality is 3, and the proper subset is 2 or 3.

14. The method as defined in claim 9, comprising the one or more computers configured to perform the step:
selecting respective data disk blocks for the first plurality of data disk blocks for which more than a predetermined number of read requests are received.

15. A system, comprising:
one or more computers operably connected to one or more computer-readable storage media;
the one or more computer-readable storage media comprising computer-readable program code capable, when executed, to perform the steps:
generating or having generated or receiving, using the one or more computers, checksum data for a first plurality of data disks blocks that are associated with each other, and storing the checksum data on a second plurality of checksum disk blocks, the checksum data generated for the first plurality of data disk blocks using a Reed-Solomon algorithm;
generating or having generated, using the one or more computers, a third plurality of exclusive-OR (XOR) disk blocks, with each of the respective XOR disk blocks associated with a different respective proper subset comprising one or more different data disk blocks and comprising XOR data for the respective one or more of the data disk blocks;
reconstructing, a single one of the data disk blocks when one or more reconstruction criteria are met, using the one or more computers, by reading one of the XOR disk blocks associated with the single data disk block and reading the other of the one or more of the data disk blocks in the proper subset of the data disk blocks associated with the one XOR disk block, and performing an XOR operation with those read disk blocks; and reconstructing, when two or more of the data disk blocks and/or the checksum blocks are lost, the two or more of the disk blocks that are lost, using the one or more computers, by reading remaining of the first plurality of the data disk blocks and the second plurality of the checksum blocks that are not lost and performing a Reed-Solomon recovery algorithm with those read disk blocks.

16. The system as defined in claim 15, where one of the one or more reconstruction criteria is that the single disk block is lost.

17. The system as defined in claim 15, where one of the one or more criteria is that the single disk block is a data disk block and is determined, using the one or more computers, to meet one or more traffic level criteria.

18. The system as defined in claim 17, wherein one of the traffic level criteria comprises a number of read requests exceeding a threshold number.

19. The system as defined in claim 15, wherein the first plurality is 6, the second plurality is 3, the third plurality is 3, and the proper subset is 2 or 3.

20. The system as defined in claim 15, comprising the one or more computers configured to perform the step:
selecting respective data disk blocks for the first plurality of data disk blocks for which more than a predetermined number of read requests are received.

* * * * *